F. HUBBARD.
COLLAPSIBLE EGG CRATE.
APPLICATION FILED JULY 17, 1913.
1,143,197.
Patented June 15, 1915.
2 SHEETS—SHEET 1.
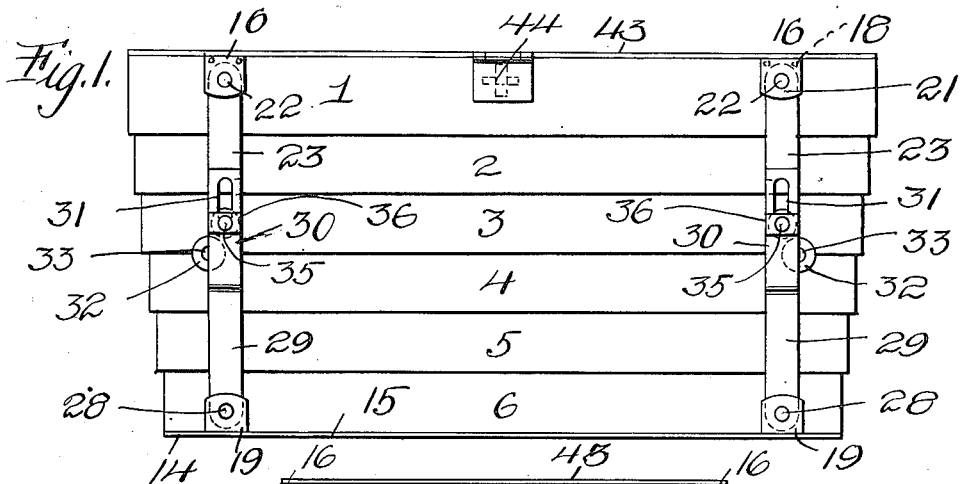
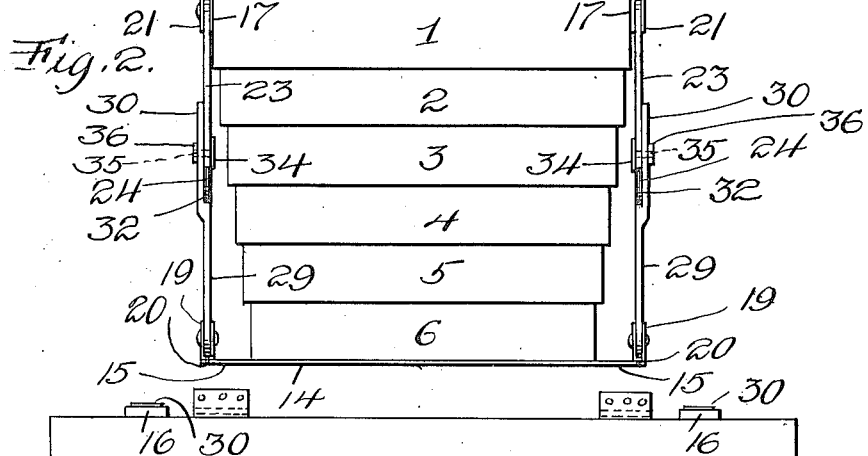
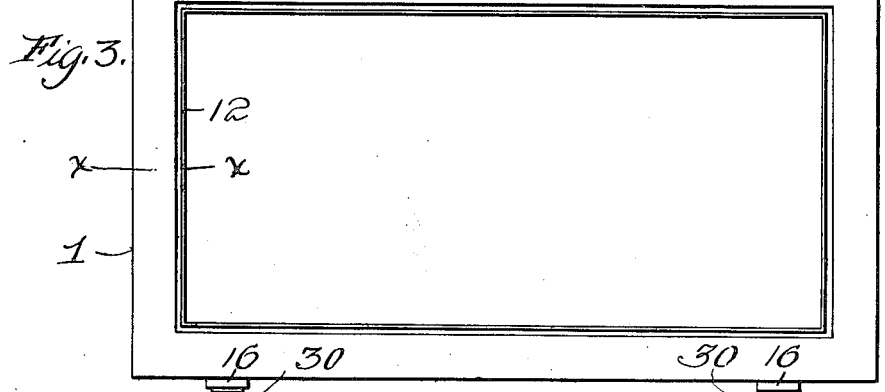
WITNESSES
Samuel Payne.
Karl H. Butler
INVENTOR
F. Hubbard.
By Henry C. Evert
ATTORNEY.

F. HUBBARD.
COLLAPSIBLE EGG CRATE.
APPLICATION FILED JULY 17, 1913.
1,143,197.
Patented June 15, 1915.
2 SHEETS—SHEET 2.
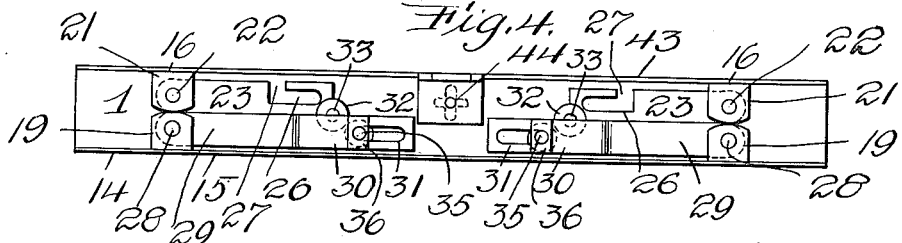
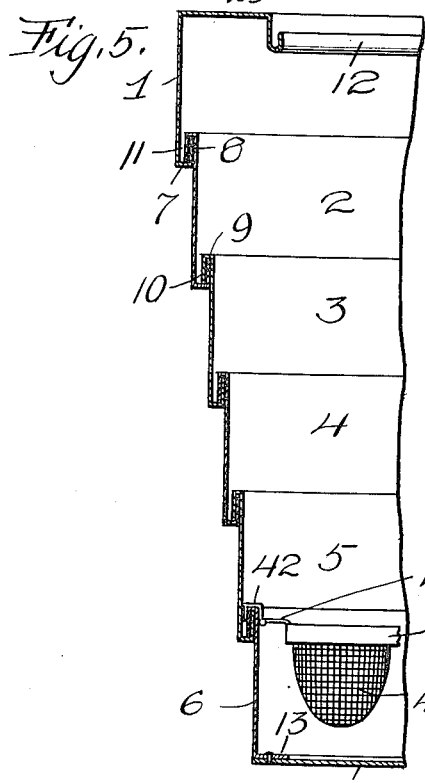
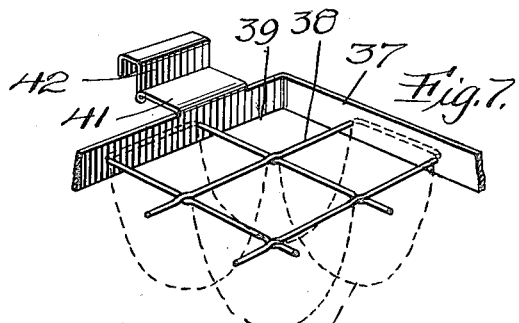
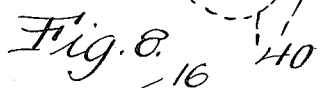
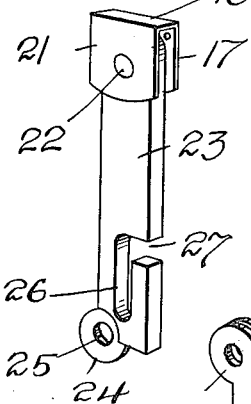
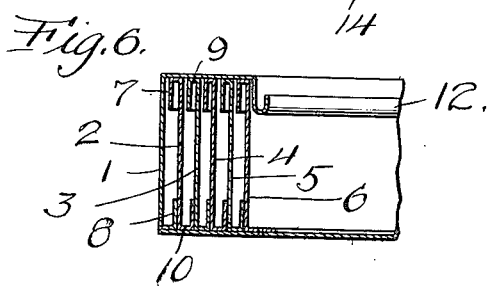
WITNESSES
Samuel Payne.
Karl H. Butler
INVENTOR
F. Hubbard.
By Henry C. Eve,
ATTORNEY

UNITED STATES PATENT OFFICE.

FRED HUBBARD, OF PITTSBURGH, PENNSYLVANIA.

COLLAPSIBLE EGG-CRATE.

1,143,197.  Specification of Letters Patent.  Patented June 15, 1915.

Application filed July 17, 1913. Serial No. 779,527.

*To all whom it may concern:*

Be it known that I, FRED HUBBARD, a citizen of the United States of America, residing at Pittsburgh, in the county of Allegheny and State of Pennsylvania, have invented certain new and useful Improvements in Collapsible Egg-Crates, of which the following is a specification, reference being had therein to the accompanying drawing.

This invention relates to collapsible egg crates, and has for its object to provide a crate of such class, in a manner as hereinafter set forth, consisting of a plurality of sections capable of being nested in a compact manner when the crate is collapsed and maintained in an extended position when the crate is packed for shipment.

A further object of the invention is to provide a collapsible egg crate, in a manner as hereinafter set forth, including a plurality of interengaging supporting sections for removable egg holding trays, the sections being of such size with respect to each other as to telescope when the crate is folded, and further being of such size with respect to each other that the egg holding trays can be conveniently positioned in their respective sections.

A further object of the invention is to provide what may be termed, in a manner as hereinafter set forth a telescopic egg crate including means in a manner as hereinafter set forth for fixedly maintaining the sections of the crate, or rather locking the sections of the crate in an extended position.

Further objects of the invention are to provide a collapsible egg crate which is comparatively simple in its construction and arrangement, strong, durable, efficient in its use, conveniently extended and collapsed, and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings, wherein like numerals denote corresponding parts throughout the several views, Figure 1 is a side elevation of a crate when extended, Fig. 2 is an end view with the crate extended, Fig. 3 is a top plan view with the lid removed, Fig. 4 is a side elevation of the crate collapsed, Fig. 5 is an enlarged detail, broken away, in longitudinal section and on line X—X of Fig. 3, the crate being extended, Fig. 6 is a view of the part shown in Fig. 5 collapsed, Fig. 7 is a perspective view broken away of a portion of an egg holding tray, and Figs. 8 and 9 are perspective views of one of a pair of links, disassembled, employed for maintaining the crate extended.

Referring to the drawings in detail 1 to 6, both inclusive indicate the supporting telescoping sections of the crate, which is preferably constructed of sheet metal although heavy card or jute board may be used, the section 1 being the top section and the section 6 the bottom section. As illustrated six supporting sections are employed, but it is obvious that the number of sections can be decreased or diminished if desired. Each of the sections consists of a rectangular frame and each of the sections 1 to 5 both inclusive, has its lower end inturned, as at 7 to form an inwardly extending supporting flange which terminates in a vertically disposed coupling member 8. Each of the sections 2 to 6 both inclusive has its upper end formed with an outwardly extending flange 9 terminating in a depending member 10. The flanges 7, 9 and members 8, 10 associate with each other for supporting and coupling the sections 1 to 6 when said sections are extended, or in other words providing means for the sections to interengage with each other when extended. When the sections are extended the members 8 snugly engage between the members 10 and their respective sections, as clearly illustrated in Fig. 5 and as the flanges 7 are of greater width than the flanges 9, spaces 11, for a purpose to be presently referred to, are formed between the member 10 of a lower section and the walls of that section with which said member 10 engages. The top of the section 1 is provided with an interiorly arranged depending hook-shaped support 12 for a purpose to be presently referred to. The bottom of the section 6 is provided with an inwardly extending flange 13 to which is secured a bottom plate 14 of the same length as the length of the section 6, but of greater width, whereby said plate 14 will project, as at 15 from each side of the section 6.

Secured to each side of the top section 1 is a pair of spaced inverted yoke-shaped brackets 16. The brackets 16 are positioned against the outer face of the side walls of the section 1 and the inner arm 17 of each bracket is fixedly secured by suitable hold fast devices 18 to the section 1. Positioned in alinement with the brackets 16 are vertically disposed yoke-shaped brackets 19 having their bottoms 20 secured to the projecting ends 15 of the bottom plate 14.

Pivotally connected at their upper ends to the front wall 21 of the brackets 16 by pins 22 are upper link members 23. Each of the members 23 is offset at its lower end, as at 24 in a circular manner and provided with an opening 25. The function of the offset portion 24 will be hereinafter referred to. Each of the members 23 at its lower end is formed with a longitudinal slot 26, which terminates in an opening 27, the function of which will be presently referred to.

Pivotally connected at their lower ends, to the brackets 19 by pins 28 are lower link members 29 which associate with the upper link members 23. The upper end of each of the members 29 is formed with a vertically disposed offset extension 30 provided with a longitudinally extending slot 31 which opposes the slot 26. Each of the members 29 is formed with a circular bifurcated apertured offset 32 for the reception of the offset 24. Extending through the offset 24 and its associate offset 32 is a pin 33 for pivotally connecting an upper link member 23 to a lower link member 29.

For locking an upper link member to a lower link member when the crate is extended so as to prevent collapsing of the crate a locking member is arranged within the slots 26, 31 and said locking member consists of a base 34, a shank 35 and a head 36. The base 34 is arranged against the inner face of the member 23, the shank 35 is slidably mounted in the slots 26, 31 and the head 36 is positioned against the outer face of the extension 30. When the locking member is in the position as shown in Figs. 1 and 2 at the bottom of the slots 26, 31, the upper and lower link members are maintained extended. To release the upper and lower link members, the locking member is shifted upwardly and passed through the opening 27 and the upper and lower link members can then be swung upon the pivot 33. The locking member is then retained in the slot 31.

Each of the sections 1 to 6 has associated therewith an egg holding tray and which consists of a rectangular frame 37 supporting horizontal and longitudinal cross wires 38 having openings 39 for the passage of the eggs. Secured to and depending from the cross wires 38 at each opening 39 is a foraminous member 40 forming a pocket for an egg. Projecting from each end bar of the frame 37 is a plurality of coupling members, only one shown, and each of said coupling members consists of an outwardly projecting plate 41 terminating in an inverted coupling hook 42, which straddles, in connection with the sections 2 to 6, the flanges 9 and members 10 and are positioned in the spaces 11. In connection with the section 1, the coupling hook 42 engages with the support 12.

Hinged to the top section 1, in a suitable manner, is a lid 43 and which is secured to the section 1, by any suitable form of lock 44.

What I claim is:—

1. An egg crate consisting of a plurality of telescopic sections capable of engaging each other when extended, a bottom plate secured to the lowermost section and extending from the sides thereof, pairs of pivoted link members pivotally connected to the uppermost section and to said bottom plate and maintaining said sections extended when the links are shifted to an upright position, and means carried by a link member of a pair and capable of engaging the other link member of the pair for maintaining the link members of the pair in an upright position to prevent collapsing of said sections when extended, and trays formed with integral inverted coupling hooks detachably connected to said sections.

2. An egg crate consisting of a plurality of telescopic sections capable of engaging each other when extended, a bottom plate secured to the lowermost section and extending from the sides thereof, pairs of pivoted link members pivotally connected to the uppermost section and to said bottom plate and maintaining said sections extended when the links are shifted to an upright position, means carried by a link member of a pair and capable of engaging the other link member of the pair for maintaining the link members of the pair in an upright position to prevent collapsing of said sections when extended, and the upper of said sections provided with means for supporting an egg holding tray, and trays formed with integral inverted coupling hooks detachably connected to said sections.

In testimony whereof I affix my signature in the presence of two witnesses.

FRED HUBBARD.

Witnesses:
S. M. WOODS,
GEO. A. YOUNG.